US007299005B1

(12) United States Patent
Yarkosky et al.

(10) Patent No.: US 7,299,005 B1
(45) Date of Patent: Nov. 20, 2007

(54) RADIO FREQUENCY REPEATER WITH AUTOMATED BLOCK/CHANNEL SELECTION

(75) Inventors: Mark L. Yarkosky, Overland Park, KS (US); Dae-Sik Oh, Overland Park, KS (US); Saad Z. Asif, Kansas City, MO (US); Kristin A. Hayne, Overland Park, KS (US); Shiva Narayanabhatla, Overland Park, KS (US); John Cheong Wai Ngan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 573 days.

(21) Appl. No.: 10/753,942

(22) Filed: Jan. 7, 2004

(51) Int. Cl.
*H04B 3/36* (2006.01)
(52) U.S. Cl. .............................. 455/7; 455/11.1; 455/15; 455/20; 455/21; 455/22; 370/226; 370/293; 370/315; 370/507
(58) Field of Classification Search .............. 455/11.1, 455/13.1, 13.3, 7, 16, 15, 25, 17, 19, 87, 455/3.02, 523, 103, 63.4, 279.1; 370/315, 370/226, 243, 246, 274, 279, 293, 316, 492, 370/501
See application file for complete search history.

(56) References Cited

U.S. PATENT DOCUMENTS

| 5,617,059 | A |   | 4/1997  | Eggleston |
|-----------|---|---|---------|-----------|
| 5,809,398 | A |   | 9/1998  | Moberg et al. ............... 455/17 |
| 5,898,382 | A | * | 4/1999  | Treatch .................... 340/2.71 |
| 5,987,304 | A |   | 11/1999 | Latt ........................... 455/17 |
| 6,119,005 | A |   | 9/2000  | Smolik |
| 6,132,306 | A |   | 10/2000 | Trompower ............... 455/11.1 |
| 6,289,724 | B1 | * | 9/2001 | Varma et al. ................. 73/52 |
| 6,360,098 | B1 |   | 3/2002 | Ganesh et al. |
| 6,404,775 | B1 |   | 6/2002 | Leslie et al. ................ 370/466 |
| 6,463,298 | B1 |   | 10/2002 | Sorenson et al. |

(Continued)

FOREIGN PATENT DOCUMENTS

WO        WO 98/53621        11/1998

(Continued)

OTHER PUBLICATIONS

Spotwave Wireless, Inc., SpotCell™ 112 (PCS-CDMA), "*Product Overview*", www.spotwave.com, 2003.

(Continued)

*Primary Examiner*—Nay Maung
*Assistant Examiner*—Dominic E. Rego

(57) ABSTRACT

A wireless repeater for receiving, amplifying and transmitting one or more wireless signals. The repeater comprises a signal processing device for determining one or more attributes of a wireless signal received from a mobile device and a memory for storing a reference list that includes one or more preferred frequency bandwidths to be repeated. The repeater also comprises a controller coupled with the signal processing device for comparing the one or more attributes of the wireless signal with the reference list, wherein the controller selects a first active set of one or more frequency bandwidths from the preferred frequency bandwidths based on the comparison. The repeater still further comprises a first reception filter coupled with the controller, where the first reception filter, responsive to control signal(s) from the controller, filters out signals, communicated to the first reception filter, having frequencies outside the first active set of frequency bandwidths.

26 Claims, 8 Drawing Sheets

U.S. PATENT DOCUMENTS

| | | |
|---|---|---|
| 6,477,354 B1 | 11/2002 | Roberts et al. |
| 6,542,741 B2 | 4/2003 | Wallstedt et al. |
| 6,571,284 B1 | 5/2003 | Suonvieri .................. 709/221 |
| 6,658,269 B1 | 12/2003 | Golemon et al. |
| 6,690,915 B1 | 2/2004 | Ito et al. |
| 6,697,603 B1* | 2/2004 | Lovinggood et al. ...... 455/13.1 |
| 6,735,432 B1 | 5/2004 | Jarett et al. |
| 6,754,196 B1* | 6/2004 | Daane et al. ............... 370/338 |
| 6,993,287 B2* | 1/2006 | O'Neill .................... 455/11.1 |
| 7,006,797 B1* | 2/2006 | Sullivan et al. .......... 455/67.11 |
| 7,035,587 B1* | 4/2006 | Yarkosky ................... 455/13.4 |
| 7,046,964 B1* | 5/2006 | Sullivan et al. .......... 455/67.11 |
| 7,190,937 B1* | 3/2007 | Sullivan et al. ............. 455/130 |
| 2001/0031621 A1 | 10/2001 | Schmutz |
| 2001/0036837 A1* | 11/2001 | Uistola ....................... 455/552 |
| 2002/0044594 A1 | 4/2002 | Bongfeldt .................. 375/213 |
| 2002/0045431 A1 | 4/2002 | Bongfeldt ................ 455/234.1 |
| 2003/0114103 A1* | 6/2003 | Dinkel et al. ................. 455/17 |
| 2004/0106408 A1 | 6/2004 | Beasley et al. |
| 2005/0227619 A1* | 10/2005 | Lee et al. ..................... 455/22 |

FOREIGN PATENT DOCUMENTS

WO     WO 2005/011150     2/2005

OTHER PUBLICATIONS

Steve Adams, "*The Demands on In-Building Solutions—Using smart antennas and adaptive techniques to improve in-building technique*", Wireless Business & Technology Magazine, May 20, 2003.

U.S. Appl. No. 10/753,941, filed Jan. 7, 2004.
Office Action from U.S. Appl. No. 10/753,941, dated Mar. 30, 2007.
U.S. Appl. No. 11/257661, filed Oct. 25, 2005.
U.S. Appl. No. 11/257648, filed Oct. 25, 2005.
U.S. Appl. No. 11/236351, filed Sep. 27, 2005.
U.S. Appl. No. 11/449527, filed Jun. 8, 2006.
U.S. Appl. No. 11/484001, filed Jul. 10, 2006.

* cited by examiner

| FREQ. | BAND | ACTIVE SET |
|---|---|---|
| F1 | A | A1, A4, A7 |
| F2 | B | B3, B5 |
| F3 | C | C1, C7, C8, C9 |

FIG. 4

| FREQ. | SYSTEM ID | NETWORK ID | LOCATION | ACTIVE SET |
|---|---|---|---|---|
| F1 | SID1 | NID1 | KANSAS CITY | A1, A3, A7, D1 |
| F2 | SID1 | NID2 | CHICAGO | B1, B4, B7 |
| F3 | SID1 | NID3 | DETROIT | C1, C2, C5 |
| F4 | SID2 | NID4 | SEATTLE | D1, D2 |

FIG. 5

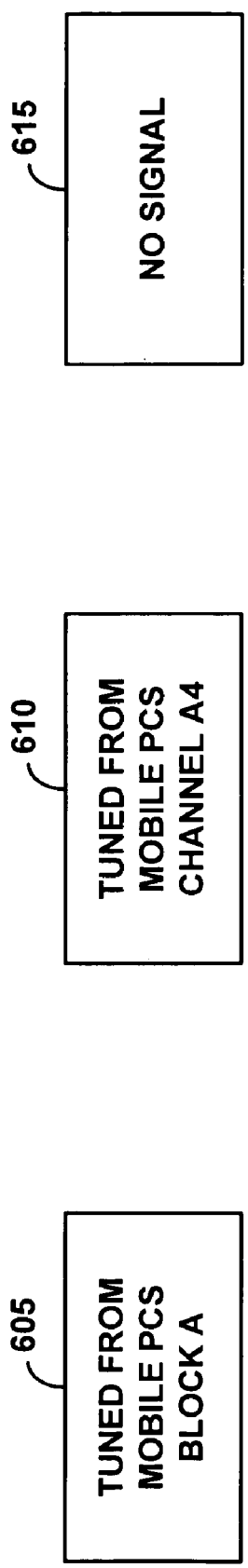

RADIO FREQUENCY REPEATER WITH AUTOMATED BLOCK/CHANNEL SELECTION

BACKGROUND

I. Field of the Invention

This invention is directed to field of wireless communications. More specifically, this is invention is directed to radio frequency repeaters with automated frequency (block, band and/or communication channel) selection.

II. Description of Related Art

Wireless communication is an ever growing industry. Wireless communication devices are applied in numerous applications, such as cellular communications, wireless (computer) networking, data delivery, and any number of other uses. For applications that employ bi-directional communication, such as cellular communications and wireless networking, signals are sent and received from at least two points. In the context of cellular communications, signals are normally communicated between a base transceiver station (e.g., a radio tower) and one or more mobile devices (e.g., cellular phones, wireless personal digital assistants, etc.).

However, various factors may contribute to the attenuation of such signals and, depending on the proximity of the mobile device to the base transceiver station (BTS), signal quality may be inadequate for reliable communications. In this regard, numerous factors may contribute to the attenuation of these signals, such as buildings, trees, hills, other radio frequency signals, etc.

One solution that has been employed to compensate for this attenuation of radio frequency (wireless) signal quality for signals communicated between mobile devices and BTSs, is the use of wireless signal repeaters (which may also be termed radio frequency repeaters or consumer electronics repeaters). Such repeaters receive signals from a BTS and then amplify those signals and retransmit them to the mobile device. Likewise, such repeaters receive signals from mobile devices, amplify those signals and retransmit them to the BTS. Such devices, as currently implemented, have certain drawbacks, however.

For example, some repeaters simply amplify and retransmit all signals that they receive across a wide range of frequencies, such as the entire spectrum of cellular communication frequencies. Because only certain bandwidths are typically used for cellular communications in a given area (not the entire available spectrum), such an approach may result in unwanted signals and/or noise being repeated. This may result in interference with the desired signals, consume more power than is desirable, and result in lower signal quality than is possible for the signals of interest.

Other repeaters require that a user manually configure the repeater for use, which may require interfacing a computer with the repeater or repeatedly pressing a button to shift through frequencies. Such devices may be complicated to set up, difficult to maintain and require technical knowledge not common to most consumers.

Still other repeaters reduce the frequency bandwidth that is amplified by mixing received signals with differential mixers prior to amplifying the signals. Such an approach may result in noise being introduced into the repeated signals due to the mixing and un-mixing employed by such approaches. Based on the foregoing, alternative approaches for receiving, amplifying and transmitting wireless (radio frequency signals) are desirable.

SUMMARY

According to an exemplary embodiment, a wireless repeater for receiving, amplifying and transmitting one or more wireless signals comprises a signal processing device for determining one or more attributes of a wireless signal received from a mobile. The signal processing device may comprise a digital signal processor or, alternatively, an RF power measurement device. The repeater further comprises a memory for storing a reference list that includes a list of one or more preferred frequency bandwidths to be received, amplified and transmitted. The reference list, for the exemplary embodiment, comprises a lookup table.

The repeater also comprises a controller coupled with the signal processing device for comparing the one or more attributes of the wireless signal from the mobile with the reference list. Depending on particular embodiment, the controller and the signal processing device may be combined as a single entity. The controller selects a first active set of one or more frequency bandwidths from the preferred frequency bandwidths based on the comparison.

The repeater further comprises a first reception filter coupled with the controller, which, responsive to one or more control signals from the controller, filters out signals, communicated to the first reception filter, with frequencies that are not within the first active set of frequency bandwidths.

The controller also provides for determining a second active set of frequency bandwidths and communicating control signals to a second reception filter to filter out signals received by the repeater that are not within the second active set of frequency bandwidths. The first and second active sets may comprise corresponding reverse-link frequency bandwidths and forward-link frequency bandwidths.

The exemplary repeater may overcome some of the disadvantages of current repeaters. For example, repeating a limited number of frequency bandwidths will reduce the radio frequency interference caused by the repeater, as well as reducing the amount of power consumed. Furthermore, the automated tuning capability of the exemplary repeater overcomes the disadvantages of tuners requiring significant user intervention to effect setup and tuning of such devices. Still further, because the signals repeated by the exemplary repeater are not mixed, the likelihood of introducing noise from one signal into another signal is reduced.

These as well as other advantages of various aspects of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 4 is a diagram illustrating a lookup table in accordance with an embodiment of the invention;

FIG. 5 is a diagram illustrating a preferred roaming list in accordance with an embodiment of the invention;

FIGS. 6A-6E are diagrams illustrating exemplary displays showing results of comparing one or more attributes of a received wireless signal with a reference list in accordance with embodiments of the invention;

DETAILED DESCRIPTION

In the following detailed description, numerous specific details are set forth in order to provide a thorough understanding of the invention. However, it will be understood that the present invention may be practiced without these specific details. In other instances, well-known methods, procedures, components and circuits have not been described in detail, so as not to obscure the present invention. The operations of methods described herein may, in some instances, be implemented in other sequences. Therefore, the sequences discussed and illustrated herein are not limiting in scope.

It is noted, that while this disclosure describes exemplary embodiments generally in the context of cellular communications, it will be appreciated that embodiments of the invention may be employed to repeat wireless signals in other types of communication systems, such as communication systems in accordance with the 802.11 wireless LAN protocol, Bluetooth, and cordless telephone communications, as some examples.

Exemplary Use of a Wireless Repeater

Figure 1:
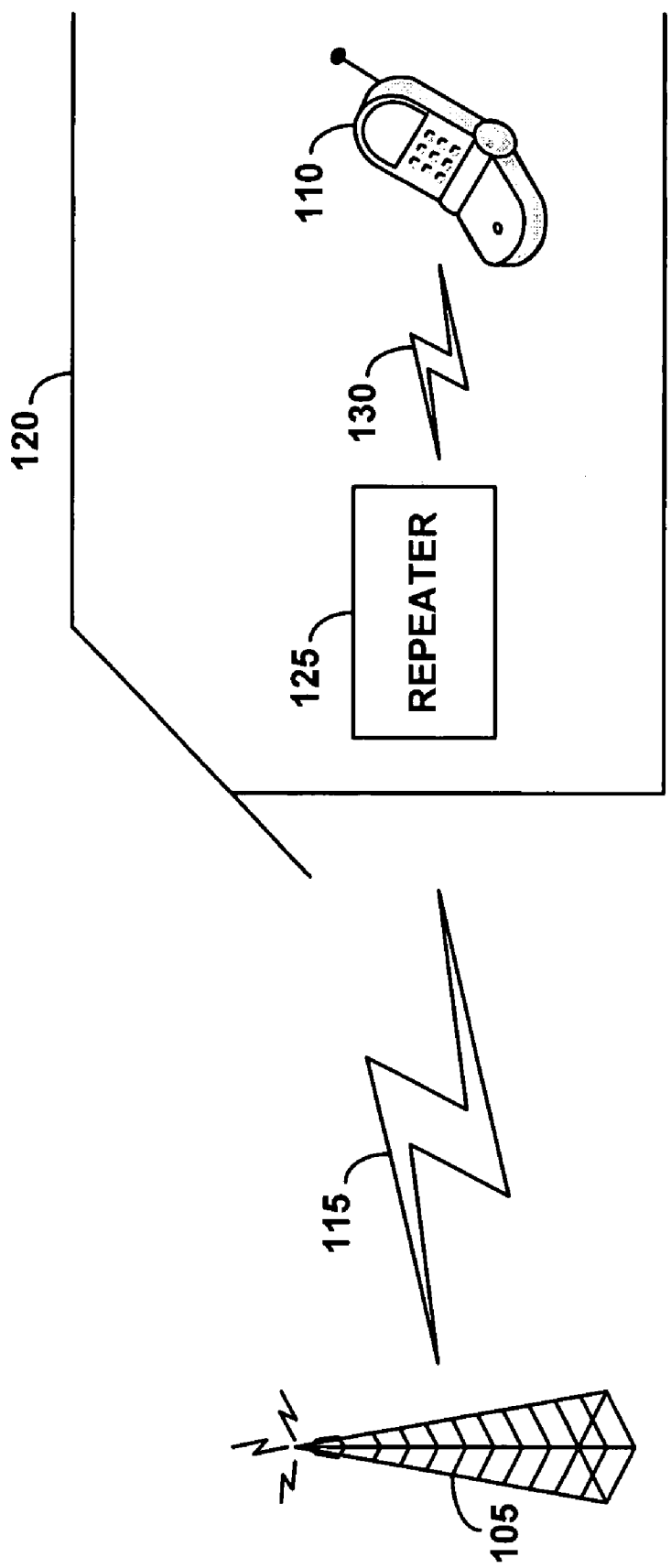
FIG. 1 is a diagram illustrating the use of a wireless repeater in a cellular communication system.

Referring now to FIG. 1, a drawing illustrating a common implementation of a wireless repeater in a cellular communication system is shown. For cellular communications, such as in a code division multiple access system (CDMA), "forward-link" signals are transmitted from a base transceiver station (BTS) 105 to a mobile device 110, such as a cell phone, over an air interface (e.g., radio frequency interface) 115. As shown in FIG. 1, the mobile device 110 is located inside a building 120. The structure of the building 120 may result in substantial attenuation of signals transmitted by the BTS 105 over the air interface 115. Therefore, the quality of those signals may be inadequate to establish reliable communications between the BTS 105 and the mobile device 110. Likewise, the signals transmitted from the mobile device 110 over the air interface 115 may also be substantially attenuated by the structure of the building 120, such that the BTS 105 is unable to receive those signals reliably.

In such a situation, a repeater 125 may be employed. For this situation, the repeater 125 typically is coupled with a first antenna that is located along, for example, an outer wall of the building 120, so as to reduce the amount of attenuation observed. The BTS 105 then communicates over the air interface 115 with the repeater 125. Wireless signals from the BTS 105 are received, amplified and transmitted to the mobile device 110 by the repeater 125 (using a second antenna) over the air interface 130. The second antenna is typically situated so as to provide RF coverage within the building 120. Such signals are commonly referred to as being communicated over a forward-link, which, for FIG. 1, is from the BTS 105 to the mobile device 110 via the repeater 125.

The mobile device 110 communicates signals to the repeater via the air interface 130. Those signals are then amplified and transmitted to the BTS 105 by the repeater 125 via the air interface 115. Signals from the mobile device 110 to the BTS 105 are said to be communicated over a reverse-link. For FIG. 1, the reverse-link is from the mobile device 110 to the BTS 105 via the repeater 125.

Exemplary Repeater with Reverse-Link Tuning

Figure 2:
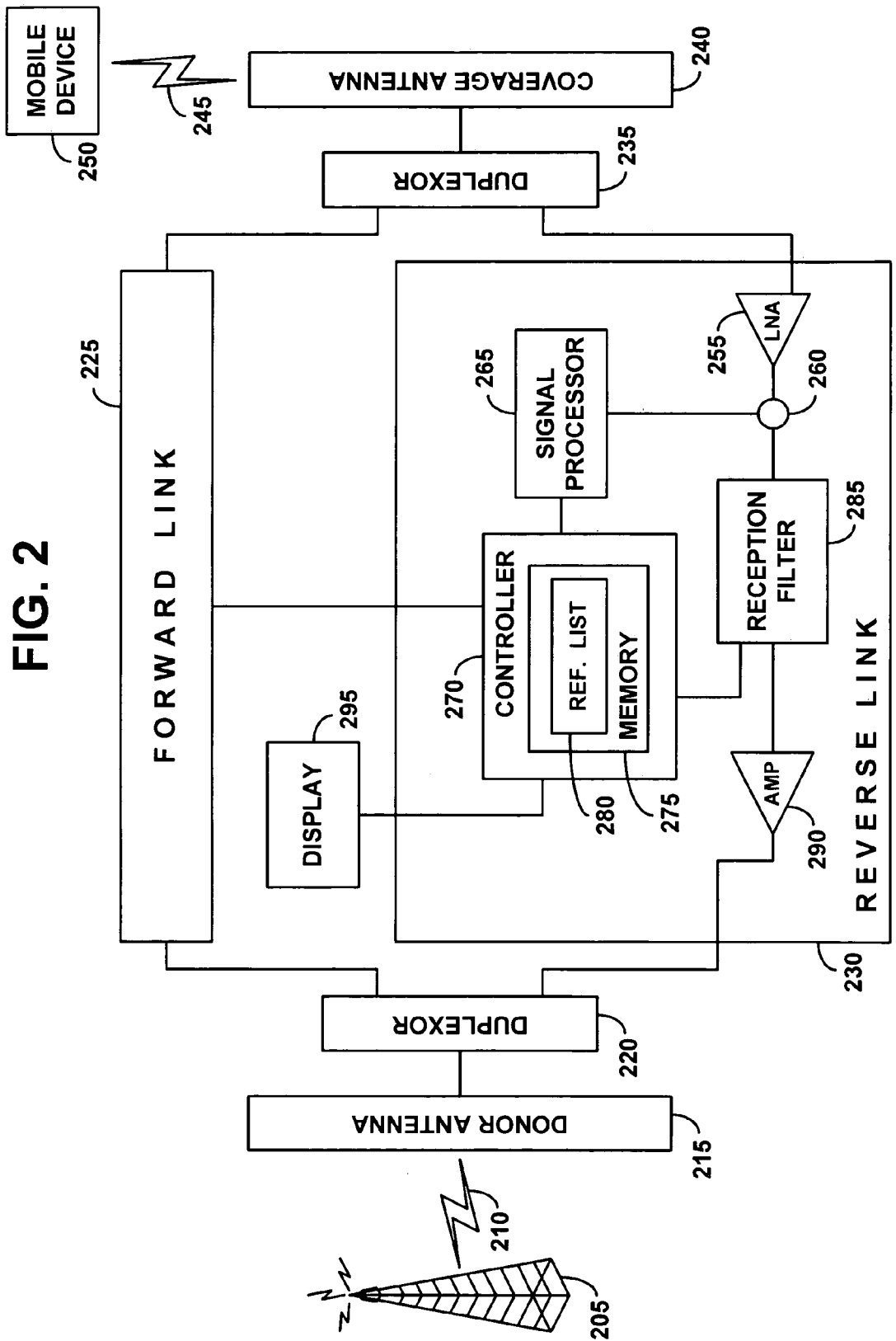
FIG. 2 is a block diagram of a wireless repeater with reverse-link tuning in accordance with an embodiment of the invention.

Referring now to FIG. 2, an implementation of an exemplary wireless repeater, with reverse-link tuning, in a cellular communication network is shown. As may be seen in FIG. 2, a BTS 205 communicates with the exemplary repeater via an air interface 210. Wireless signals are communicated to/from the repeater and the BTS 205 with a donor antenna 215. Such antennas are known and will not be described in detail here. The donor antenna 215 is coupled with a first duplexor 220. The first duplexor 220 provides for concurrent handling of transmit and receive signals between the BTS 205 and the repeater using the donor antenna 220. As shown in FIG. 2, the first duplexor 220 is also coupled to a forward link block 225 and a reverse-link block 230.

Forward link signals from the BTS 205 to the mobile device 250 may be processed by the forward link block 225 of the repeater. A repeater with forward-link tuning will be described below with reference to FIG. 3. On the other hand, the reverse link signals from the mobile device 250 to the BTS 205 may be processed by the reverse-link block 230 of the repeater. The reverse-link block 230 also tunes the repeater, as will be discussed in detail below.

The repeater shown in FIG. 2 further comprises a second duplexor 235 coupled with the forward link block 225, the reverse link block 230 and a coverage antenna 240. The second duplexor 235 provides for concurrent handling of transmit and receive signals between the mobile device 250 and the repeater using the coverage antenna 240, in like fashion with the first duplexor 220 for signals between the repeater and the BTS 205. The repeater communicates with the mobile device 250 (via the coverage antenna 240) over an air interface 245.

Wireless signals from the mobile device 250 are received by the coverage antenna 240 and then communicated to the second duplexor 235. The second duplexor 235 then communicates those signals to the reverse-link block 230 for processing. The wireless signals are then received by a low noise amplifier (LNA) 255, which is employed to improve the signal to noise ratio of signals processed by the reverse-link block 255. After processing by the LNA 255, the wireless signals received by the coverage antenna 240 are communicated to a coupler 260. A portion of those wireless signals are then transmitted to a signal processing device 265.

When the repeater is being tuned, such as when the repeater is first powered up or is restarted, a signal processing device 265 will analyze a wireless signal received from the mobile device 250. The signal processing device 265 then determines one or more attributes of the wireless signal received from the mobile device, such as a frequency of the signal or other information included in the signal. In this regard, the signal processing device 265 may take a number of forms.

For example, in certain embodiments the signal processing device 265 may comprise a radio frequency power measurement device. This measurement device is employed to determine a frequency of the wireless signal. The frequency of the wireless signal is then compared with a reference list 280, using a controller 270, and the results of this comparison are used to tune the repeater, as will be discussed in further detail below. The reference list may be stored in a memory 275, which for the embodiment illustrated in FIG. 2 is included in the controller 270. Alternatively, the memory 275 may be separate from the controller 270.

For certain embodiments, the wireless signal from the mobile device may be a carrier signal that is within a frequency bandwidth supported by the repeater, such as a PCS cellular communication band. Alternatively, the wireless signal may be a Bluetooth or an 802.11 wireless LAN signal if the repeater is being employed in a wireless computing network.

As one alternative, the signal processing device 265 may comprise a digital signal processor (DSP). In such embodiments, the DSP may process the wireless signal from the mobile device 250 to determine the one or more attributes. For example, if the mobile device 250 has just been powered on, the signal received by the repeater may comprise an access probe signal. The access probe signal may include information that indicates a carrier frequency and/or frequency band that was last used by the mobile device. This information may then be communicated to the controller 270 to be compared with the reference list 280, which may comprise a lookup table, as is described below with reference to FIG. 4.

Based on the comparison of the one or more attributes, as determined by the signal processing device 265, with the reference list 280, the controller 270 may determine a first active set of frequency bandwidths that the repeater will receive, amplify and transmit from the mobile device 250 to the BTS 205. Such determinations will be discussed in further detail below with reference to FIG. 4. Briefly, however, the frequency bandwidths of the first active set may comprise reverse-link PCS bandwidths in the frequency range of 1850 to 1910 MHz, such as one or more 1.25 MHz bandwidths (e.g., a PCS communication channel bandwidth).

The controller 270, based on the above comparison, communicates one or more control signals to a first reception filter 285. The first reception filter 285 then filters out radio frequency signals received by the coverage antenna 240 that have frequencies that are not within the first active set of frequency bandwidths. In this regard, the first reception filter 285 may comprise an electronically tunable filter or signal processor. For example, the reception filter 285 may comprise a plurality of band-pass filters that are enabled by control signals received from the controller 270. In an alternative embodiment, the first reception filter 285 may comprise a DSP or may be implemented by the signal processor 265 for embodiments that employ a DSP to analyze incoming wireless signals from the mobile device 250.

The repeater of FIG. 2 may further comprise a second reception filter (not shown) coupled with the donor antenna 215 via the first duplexor 220 (and an LNA and a coupler, both not shown). The second reception filter is also coupled with the controller 270 and receives control signals from the controller 270, which correspond with a second active set of frequency bandwidths. For example, in a CDMA cellular communication system, the second active set of frequency bandwidths comprise a set of forward-link communication bandwidths that correspond with the first active set of reverse-link communication bandwidths. For instance, if the first active set includes a reverse-link bandwidth of 1851.25 MHz to 1852.5 MHz, the second active set would include a corresponding forward-link bandwidth of 1931.25 to 1932.25. As is known, for CDMA based PCS communication systems, the reverse-link bandwidths may be between 1850 MHz and 1910 MHz with the corresponding forward-link bandwidths between 1930 MHz and 1990 MHz. That is, the forward-link communication channel bandwidths are offset from their corresponding reverse-link communication channel bandwidths by 80 MHz.

In similar fashion as the first reception filter 285, the second reception filter filters out signals received with the donor antenna 215 with frequencies that are not within the second active set of frequency bandwidths. For CDMA based PCS systems, the second active set of bandwidths may be determined by offsetting the reverse-link bandwidths of the first active set by 80 MHz, as noted above.

Depending on the particular embodiment, the wireless repeater of FIG. 2, may be tuned is to repeat contiguous communication channels based on the comparison described above. For instance, the repeater may be tuned to repeat an entire PCS frequency block (e.g. a 15 MHz block, such as the A, B or C PCS frequency blocks, or the 5 MHz D, E or F PCS frequency blocks). Alternatively, the repeater of FIG. 2 may be tuned, based on the above-described comparison, to a 5 MHz band within one of the 15 MHz A, B and C blocks. Such an approach depends on the particular communication network with which the repeater is employed and the reference list 280 that is implemented in the repeater.

Because the repeater shown in FIG. 2 is tuned based on comparing one or more attributes of a wireless signal received from the mobile device 250 with a reference list, some of the disadvantages of current repeaters may be overcome. For example, repeating a limited number of frequency bandwidths will reduce the radio frequency interference caused by the repeater, as well as reducing the amount of power consumed. Furthermore, the automated tuning capability of the repeater of FIG. 2 overcomes the disadvantages of tuners requiring significant user intervention to effect setup and tuning of such devices. Still further, because the signals repeated by the repeater of FIG. 2 are not mixed, the likelihood of introducing noise from one signal into another signal is reduced.

The reverse link block 230 of the repeater of FIG. 2 still further comprises a power amp 290. The power amp receives filtered signals from the reception filter 285 and amplifies those signals. The amplified signals are then communicated to the first duplexor 220, and then to the BTS 205 via the donor antenna 215 and the air interface 210.

The wireless repeater of FIG. 2 still additionally comprises a display device 295 for displaying a result of the comparison of the one or more attributes of a wireless signal with the reference list. Such displaying will be discussed in further detail below with reference to FIG. 6.

Exemplary Repeater with Forward-Link Tuning

Figure 3:
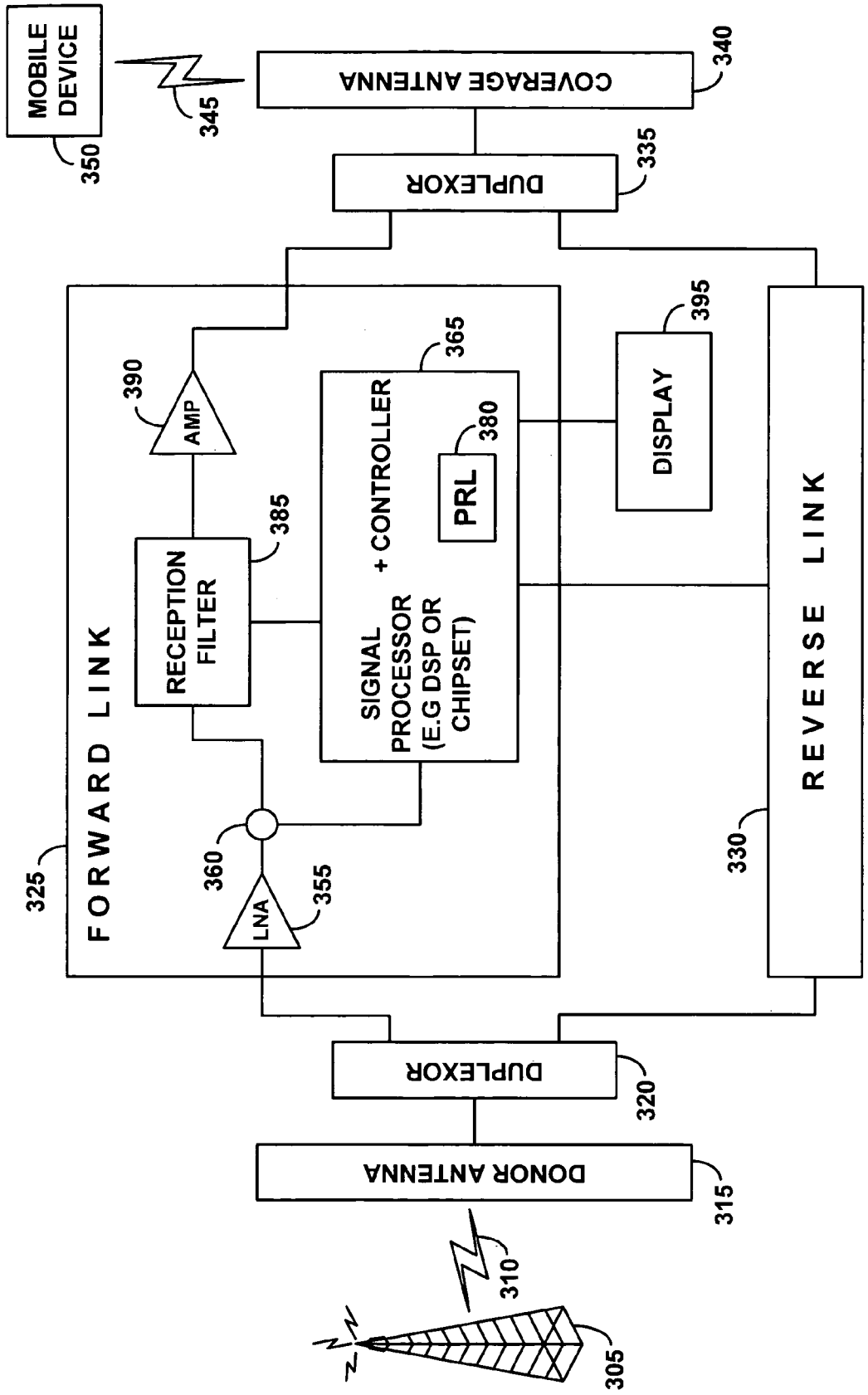
FIG. 3 is a block diagram of a wireless repeater with forward-link tuning in accordance with an embodiment of the invention.

Referring now to FIG. 3, an implementation of an exemplary wireless repeater, with forward-link tuning, in a cellular communication network is shown. As may be seen in FIG. 3, components of the embodiment illustrated in FIG. 3 that are analogous with components of FIG. 2 are referenced with like 300 series reference numbers as the 200 series numbers of the analogous components in FIG. 2. For the sake of brevity and clarity, the components in FIG. 3 that operate in substantially similar fashion as their analogous components in FIG. 2 will not be discussed in detail with reference to FIG. 3. In this regard, the BTS 310, the air interface 310, the donor antenna 315, the duplexors 320 and 335, the coverage antenna 340, the air interface 345 and the mobile device 350 operate in a substantially similar fashion as their analogous components in FIG. 2. Only the differences between the components of FIGS. 2 and 3 will be described in detail below.

While the repeater shown in FIG. 2 is tuned based on signals processed in the reverse-link block 230, the repeater shown in FIG. 3 is tuned based on signals processed in the forward-link block (e.g., wireless signals received from the BTS 205). In this respect, the forward link signals are received by the donor antenna 315 and communicated to the forward-link block by the first duplexor 320. The signals are then processed by the LNA 355 to improve their signal to noise ratio and then communicated to the signal processor and controller (processor) 365 via the coupler 360. In comparison to the repeater of FIG. 2, the repeater of FIG. 3 comprises a combined signal processor and controller in the form of processor 365. It will, of course, be appreciated that such a combined device may also be employed in the repeater of FIG. 2.

For the repeater shown in FIG. 3, the processor 365 may comprise a microprocessor device with digital signal processing capabilities, or may comprise a DSP. Alternatively, the processor 365 may comprise a CDMA mobile device chipset for analyzing signals received by the repeater from the BTS 305 in order to tune the repeater. In the exemplary embodiment, the wireless signal received from the BTS is a synch-channel signal. As is known, for CDMA systems, a synch-channel signal is transmitted on a communication channel frequency within, for example, the PCS bandwidth using a Walsh code of 32. Such techniques are known and, therefore, are not discussed further herein.

The synch-channel signal is a repeating signal that includes a synch-channel message that comprises a system identification (system ID) and a network ID with which the BTS 305 transmitting the synch-channel message is associated. Such synch-channel messages are also known and will not be described in further detail here.

The processor 365 determines one or more attributes of the synch-channel signal, such as its frequency, the system ID and/or the network ID, which are included in the synch-channel message, as described above. The system ID typically identifies a wireless communication service provider, while the network ID identifies a particular geography for a respective portion of that provider's network. For example, a system ID of 1039 and a network ID of 448 may correspond to Sprint's PCS network in Kansas City, Mo. Furthermore, the frequency of the signal from the BTS 305 will be of a frequency that is used by the Sprint network in the Kansas City area, providing further information for tuning the repeater of FIG. 3.

After the controller 365 determines the one or more attributes of the wireless signal received from the BTS, those attributes are compared with a reference list, which for this particular embodiment takes the form of a preferred roaming list (PRL) 380, such as is utilized by mobile devices for facilitating communications with the BTS 305 and other BTSs, as is known. The PRL may be stored in the controller 365, such as in a memory, or may be stored elsewhere, depending on the embodiment.

Based on the comparison of the attributes determined by the controller 365, a first active set of one or more frequency bandwidths is determined based on a comparison of the attributes with the PRL. The controller then communicates one or more control signals to a reception filter 385, which then filters out signals that are communicated to the repeater via the donor antenna 305 that have frequencies that are not within the first active set of frequency bandwidths. Further, the controller also communicates with a second reception filter (not shown) in the reverse-link block 330 to filter out signals that are not in a second active set of frequency bandwidths. For the exemplary embodiment shown in FIG. 3, the second active set of frequency bandwidths comprises a set of reverse-link bandwidths that correlate with a set of forward-link bandwidths included in the first active set. For this embodiment, the forward-link and reverse-link bandwidths are in the PCS frequency ranges of 1930 MHz to 1990 MHz (forward-link) and 1850 MHz and 1910 MHz (reverse-link).

In similar fashion as the repeater of FIG. 2, the repeater shown in FIG. 3 comprises a display 395 for displaying the results of the comparison of the one or more attributes of the wireless signal received from the BTS 305 with the reference list (e.g., the preferred roaming list 380). Such displays will be discussed in further detail with respect to FIG. 6.

Exemplary Lookup Table for Reverse-Link Tuning

Figure 4:
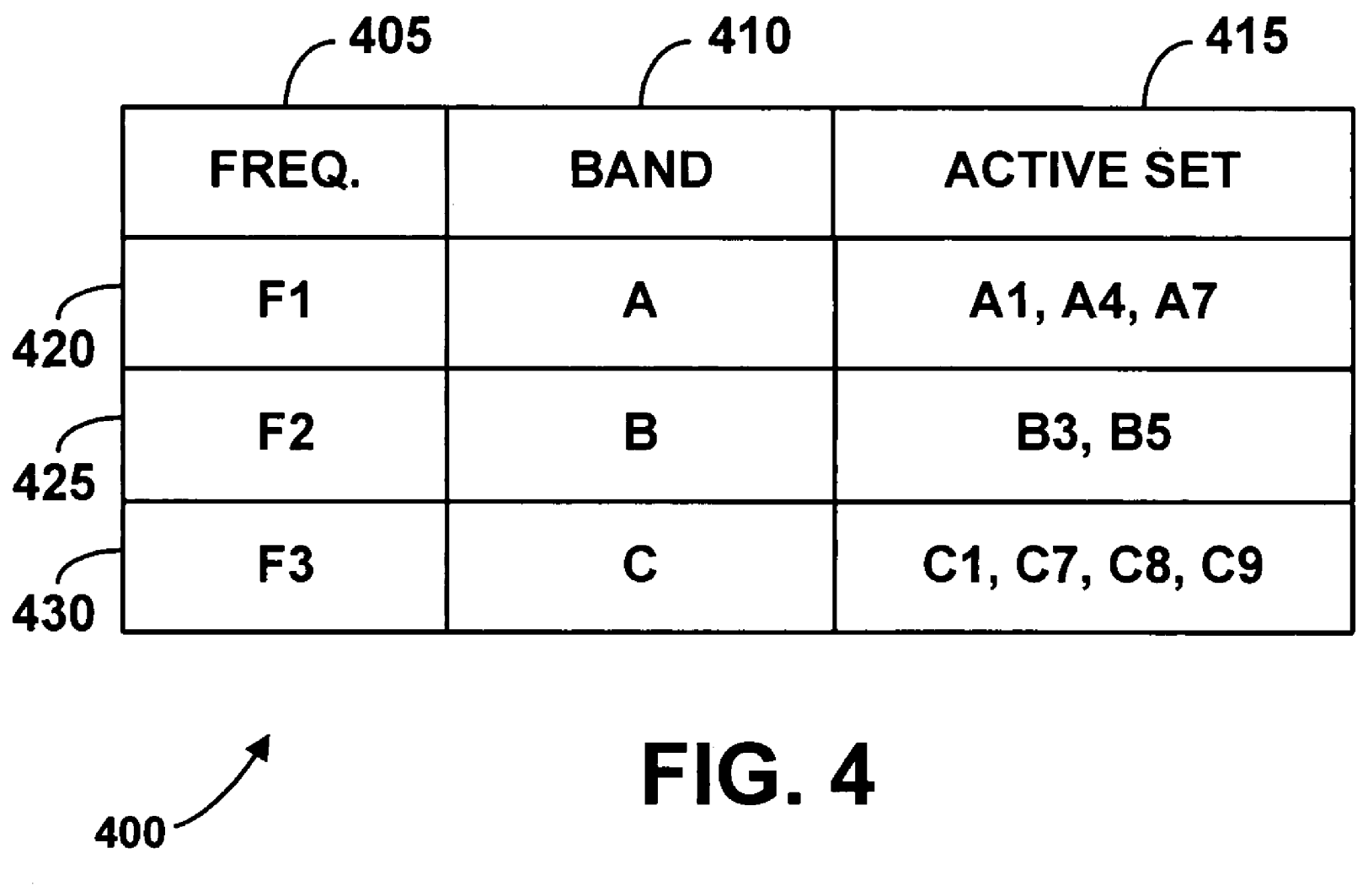

Referring now to FIG. 4, a table illustrating an exemplary lookup table 400 that may be used with the repeater shown in FIG. 2 for reverse-link tuning is shown. It will be appreciated that this table is exemplary and that other configurations may be used and additional or fewer parameters may be included in the table.

The table 400 includes three columns 405, 410 and 415. The column 405 includes a list of preferred frequencies for reverse link communications, which may be determined based on a number of factors, such as wireless carriers that are supported by the repeater, for example. In the lookup table 400, a column 410 includes a list of frequency bands that corresponds with preferred frequencies listed in the column 405. The column 415 includes a list of active sets of communication channels (e.g., PCS communication channels) that correspond with each of the preferred frequencies.

By way of example, if the signal processing device 265 of the repeater shown in FIG. 2 determines that the frequency of a wireless signal received from the mobile device 250 is of frequency F1, as in row 420, the repeater may tune itself to channels A1, A4 and A7 (communication channels in the PCS A block) using the reception filter 285 to filer unwanted signals.

Alternatively, if the received signal is of frequency F2, the repeater may be tuned to repeat channels B3 and B5 (which are sub channels in the PCS B block frequencies) in correspondence with row 425 of the lookup table 400. Likewise, if the received signal is of frequency F3, the repeater may be tuned to channels C1, C7, C8 and C9.

If the signal received from the mobile device 250 that is processed by the signal processing device 265 is an access probe, a last used communication channel frequency and or frequency block of the mobile device may be determined from the access probe. The last used communication channel frequency/block may then be compared with the lookup table 400 to determine the active set of frequency bandwidths to be amplified and transmitted by the repeater.

Exemplary Preferred Roaming List

Referring now to FIG. 5, a table illustrating an exemplary PRL 500 that may be used with the repeater shown in FIG. 3 for forward-link tuning is shown. It will be appreciated that this table is exemplary and that other configurations may be used and additional or fewer parameters may be included in the PRL.

The PRL 500 includes five columns 505, 510, 515, 520 and 525. The column 505 includes a list of preferred frequencies for forward-link communications (again, this list is exemplary). In the PRL 500, column 510 includes a list of system IDs that corresponds with the preferred frequencies listed in column 505. Column 515 includes a list of network IDs that corresponds with the preferred frequencies listed in the column 505 and the system IDs listed in column 510. Column 520 includes a list of geographic locations that correspond with the system IDs listed in the column 510 and the network IDs listed in the column 515. The column 525 includes a list of active sets (frequency bandwidths) of communication channels (e.g., PCS communication channels) that correspond with the previous columns 505-520 of the PRL 500.

By way of example, if the processor 365 determines that the frequency of a wireless signal received from the mobile device 350 is of frequency F1, the system ID in a synch-channel message is SID1 and the network ID is "NID1", the repeater will determine that it is operating in Kansas City on, for example, Sprint's PCS network (SID1), in accordance with row 530 of the PRL 500. The forward-link (and reverse-link) would then be tuned to channels A1, A3, A7 and D1 (using the 80 MHz offset). The inclusion of D1 in the repeated channels may be due to high level of wireless communication traffic on the A band for the particular network with which the repeater is being employed (in this instance, Sprint's Kansas City network). Rows 535, 540 and 545 in FIG. 5 provide additional examples of PRL entries for determining an active set of forward-link frequencies.

Exemplary Displays

Referring now to FIGS. 6A-6E, exemplary displays for displaying the results of comparing the determined attributes of wireless signals (forward-link and reverse link), as were previously described, are shown. FIGS. 6A and 6B are exemplary displays for comparisons associated with reverse-link tuning. In this respect, FIG. 6A illustrates a display 605 that reads "TUNED FROM MOBILE PCS BLOCK A." A repeater (such as the repeater of FIG. 2) displaying this message has been tuned based on a signal received from a mobile device (such as an access probe) and is repeating all channels within the PCS 'A' block.

As another example, FIG. 6B illustrates a display 610 that reads "TUNED FROM MOBILE PCS CHANNEL A4." In this particular situation, an RF power measurement device may have been used to determine the frequency of a signal from the mobile device and, as was previously described, the repeater is then tuned to repeat the communication channel bandwidth associated with that frequency.

FIG. 6C illustrates a display 615 that reads "NO SIGNAL." Such a display message may indicate that the repeater is not receiving any reverse-link and/or forward-link signals that it may employ to accomplish tuning the repeater. Alternatively, such a message may indicate that the repeater is not receiving any wireless signals that match the entries in a lookup table (for reverse-link tuning) or a PRL (for forward-link tuning).

FIGS. 6D and 6E illustrate displays that correspond, respectively, with rows 530 and 545 of the PRL 500 illustrated in FIG. 5. In FIG. 6D, a display 620 is illustrated that reads "SPRINT PCS KANSAS CITY." Such a display indicates that a forward-link signal, such as a synch-channel signal, was used to perform forward-link tuning with a system ID of SID1 and a network ID of NID1 being determined from, for example, a synch-channel message. FIG. 6E is a display that reads "OTHER PROVIDER SEATTLE", which as indicated above, corresponds with row 545 of the PRL 500.

Exemplary Method for Reverse-Link Tuning

Figure 7:
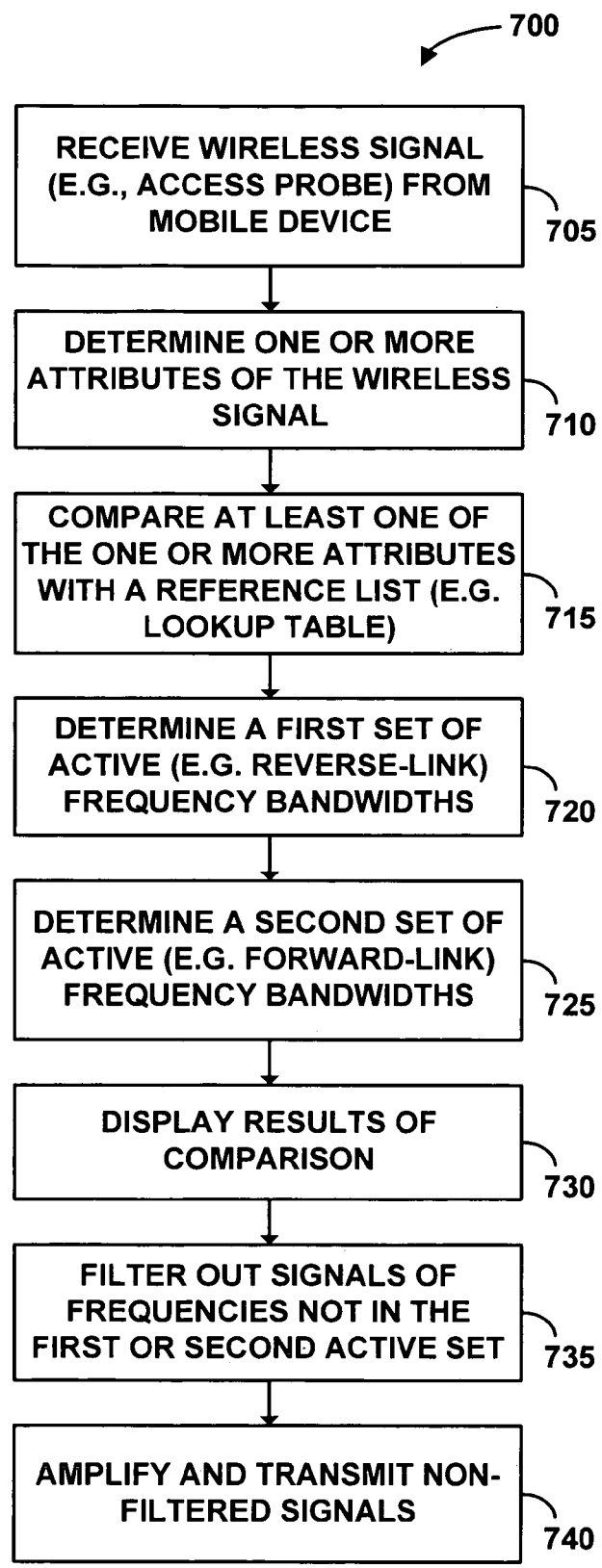
FIG. 7 is a flowchart illustrating a method for reverse-link tuning in accordance with an embodiment of the invention.

Referring now to FIG. 7, a flowchart illustrating an exemplary method 700 for tuning a wireless repeater using reverse-link signals is shown. The method comprises, at block 705 receiving a wireless signal, such as an access probe, from a mobile device. At block 710, the method 700 comprises determining one or more attributes of the wireless signal from the mobile device, such as a frequency from the RF power of the signal or a last used frequency (e.g., channel, band or block) determined from an access probe. At block 715, the one or more attributes are compared with a reference list (such as a lookup table). At block 720, a first active set of frequency bandwidths is determined based on the comparison performed at block 715. At block 725, the method 700 further comprises determining a second active set of frequency bandwidths based on the comparison of the attributes with the reference list. The second active set may be a set of forward-link frequency bandwidths that corresponds with a set of reverse-link frequency bandwidths included in the first active set.

The method 700 still further comprises, at block 730, displaying the results of the comparison performed at block 715, such as described above with reference to FIGS. 6A-6E. At block 735, the method includes filtering out signals, received by the wireless repeater, with frequencies not in the first or second active sets of frequency bandwidths. The method 700 still further comprises, at block 740, amplifying and transmitting the non-filtered signals to a BTS.

Exemplary Embodiment for Forward-Link Tuning

Figure 8:
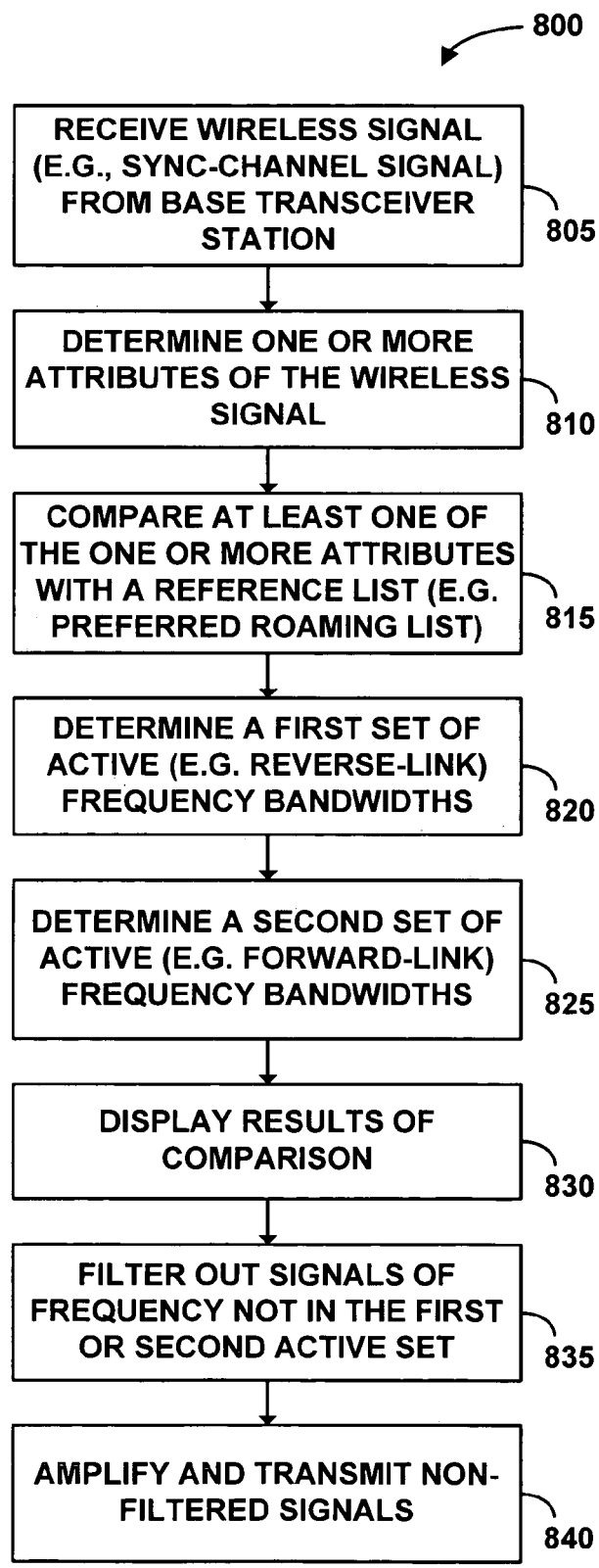
FIG. 8 is a flowchart illustrating a method for forward-link tuning in accordance with an embodiment of the invention.

Referring now to FIG. 8, a flowchart illustrating an exemplary method 800 for tuning a wireless repeater using forward-link signals is shown. The method comprises, at block 805 receiving a wireless signal, such as a synch-channel signal from a BTS. At block 810, the method 800 comprises determining one or more attributes of the wireless signal from the BTS, such as a system ID and a network ID from a synch-channel message. At block 815, the one or more attributes are compared with a reference list (such as a preferred roaming list) At block 820, a first active set of frequency bandwidths is determined based on the comparison performed at block 815. At block 825, the method 800 comprises determining a second active set of frequency bandwidths based on the comparison performed at block 815. The second active set may be a set of reverse-link frequency bandwidths that corresponds with a set of forward-link frequency bandwidths included in the first active set.

The method 800 still further comprises, at block 830, displaying the results of the comparison performed at block 815, such as was described above with reference to FIG. 6. At block 835, the method comprises filtering out signals, received by the wireless repeater, that have frequencies that are not in the first or second active sets of frequency bandwidths. The method 800 then further comprises, at block 840, amplifying and transmitting the non-filtered signals to, for example, a mobile device.

CONCLUSION

Exemplary arrangements and embodiments in accordance with the present invention have been described herein. It will be appreciated, however, that those skilled in the art will understand that changes and modifications may be made to these arrangements and embodiments without departing from the true scope and spirit of the present invention, which is defined by the following claims.

What is claimed is:

1. A wireless repeater for receiving, amplifying and transmitting one or more wireless signals comprising:
   a signal processing device for determining one or more attributes of a wireless signal received from a mobile device;
   a memory for storing a reference list that includes a list of one or more preferred frequency bandwidths to be amplified and transmitted;
   a controller coupled with the signal processing device for comparing the one or more attributes of the wireless signal with the reference list, wherein the controller selects a first active set of one or more frequency bandwidths from the preferred frequency bandwidths based on the comparison; and
   a first reception filter coupled with the controller, wherein the first reception filter, responsive to one or more control signals from the controller, filters out signals, communicated to the first reception filter, having frequencies not within the first active set of frequency bandwidths.

2. The wireless repeater of claim 1, wherein the one or more attributes includes a frequency of the wireless signal from the mobile device.

3. The wireless repeater of claim 1 further comprising:
   a first antenna coupled with the signal processing device for receiving the wireless signal from the mobile device;
   a second antenna for receiving wireless signals from a base station transceiver; and
   a second reception filter coupled with the second antenna and the controller, wherein the second reception filter, responsive to control signals from the controller, filters out signals, received with the second antenna, having frequencies not within a second active set of frequency bandwidths, wherein the second active set of frequency bandwidths is determined based on the comparison of the one or more attributes of the wireless signal from the mobile device with the reference list.

4. The wireless repeater of claim 3, wherein the first and second active sets of frequency bandwidths comprise respective, corresponding sets of reverse-link and forward-link PCS communication bandwidths.

5. The wireless repeater of claim 4, wherein the corresponding sets of reverse-link and forward-link bandwidths comprise at least one forward-link communication channel and at least one corresponding reverse-link communication channel.

6. The wireless repeater of claim 3, wherein the first antenna comprises a coverage antenna for communicating wireless signals between the mobile device and the repeater, and the second antenna comprises a donor antenna for communicating wireless signals between the base transceiver station and the repeater.

7. The wireless repeater of claim 3, wherein the first and second sets of frequency bandwidths each include at least one respective contiguous range of frequency bandwidths, each of the respective contiguous ranges corresponding with one of a PCS communication band or block.

8. The wireless repeater of claim 1, wherein the signal processing device comprises a digital signal processor.

9. The wireless repeater of claim 1, wherein the signal processing device comprises a radio frequency power measurement device.

10. The wireless repeater of claim 1, wherein each of the preferred frequency bandwidths in the reference list corresponds with a respective mobile communication network.

11. The wireless repeater of claim 10, wherein the reference list further includes, for each preferred frequency bandwidth, information designating the respective mobile communication network.

12. The wireless repeater of claim 1, wherein the reference list comprises a lookup table.

13. The wireless repeater of claim 1, wherein the one or more attributes includes a last used frequency band of the mobile device,
   wherein the wireless signal received from the mobile device comprises an access probe, and
   wherein the access probe includes information indicating the last used frequency band for the mobile device.

14. The wireless repeater of claim 13, wherein the signal processing device communicates the information indicating the last used frequency band to the controller, and the controller compares the information with the reference list to determine the first active set of frequency bandwidths.

15. The wireless repeater of claim 1, further comprising a display device for displaying a result of the comparison of the one or more attributes with the reference list.

16. A wireless repeater for receiving, amplifying and transmitting one or more wireless signals comprising:
   a first antenna for receiving a wireless signal from a mobile device;
   a signal processing device coupled with the first antenna for determining from the wireless signal from the mobile device, at least one of a frequency of the signal and information indicating a last used frequency band of the mobile device;
   a reference list that contains preferred frequencies to be amplified and transmitted;
   a controller coupled with the signal processing device for comparing at least one of the frequency of the wireless signal from the mobile device and the last used frequency band with the reference list, wherein the controller selects a first active set of frequency bandwidths from the preferred frequency bandwidths based on the comparison;
   a first reception filter coupled with the controller, wherein the first reception filter, responsive to control signals from the controller, filters out signals, received with the first antenna, of frequencies not in the first active set of frequency bandwidths;
   a first amplifier coupled with the first reception filter for amplifying signals received from the reception filter; and
   a second antenna coupled with the first amplifier for transmitting the amplified signals to a base transceiver station.

17. The wireless repeater of claim 16, further comprising a second reception filter coupled with the controller, wherein the second reception filter, responsive to control signals from the controller, filters out signals, received with the second antenna, of frequencies not in a second active set of frequency bandwidths, the second active set being based on the comparison of at least one of the frequency of the wireless signal from the mobile device and the last used frequency band with the reference list.

18. The wireless repeater of claim 17, wherein the frequency bandwidths of the first active set comprise reverse-link PCS bandwidths in the frequency range of 1850 to 1910 MHz and the bandwidths of the second active set comprise forward-link PCS bandwidths in the frequency range of 1930 to 1990 MHz.

19. The wireless repeater of claim 16, wherein the signal from the mobile device comprises an access probe signal.

20. The wireless repeater of claim 16, wherein the reference list comprises a lookup table.

21. The wireless repeater of claim 16, wherein the signal processing device comprises a digital signal processor.

22. The wireless repeater of claim 16, wherein the signal processing device and the controller are included in a single electronic component.

23. A method of receiving, amplifying and transmitting one or more wireless signals using a wireless repeater comprising:
   receiving a wireless signal from a mobile device;
   determining one or more attributes of the wireless signal from the mobile device;
   determining a first active set of frequency bandwidths by comparing at least one of the one or more attributes with a reference list that includes preferred frequency bandwidths;
   filtering out signals, received by the wireless repeater with a first receiving device, having frequencies not within the first active set of frequency bandwidths prior to amplifying and transmitting.

24. The method of claim 23, further comprising:
   determining a second active set of frequency bandwidths based on the comparison of the at least one of the one or more attributes with the reference list;
   filtering out signals, received by the wireless repeater with a second receiving device, having frequencies not within the second active set of frequency bandwidths.

25. The method of claim 24, wherein the first active set of frequency bandwidths comprises reverse-link PCS bandwidths and the second active set of frequency bandwidths comprises forward-link PCS bandwidths.

26. The method of claim 23, further comprising displaying a result of the comparison of the at least one of the one or more attributes with the reference list.

* * * * *